United States Patent
Low et al.

(10) Patent No.: US 6,776,220 B1
(45) Date of Patent: Aug. 17, 2004

(54) SPACECRAFT RADIATOR SYSTEM USING CROSSING HEAT PIPES

(75) Inventors: Lenny Low, Hillsborough, CA (US); Chris Goodman, Fremont, CA (US)

(73) Assignee: Space Systems/Loral, Inc, Palo Alto, CA (US)

( * ) Notice: Subject to any disclaimer, the term of this patent is extended or adjusted under 35 U.S.C. 154(b) by 439 days.

(21) Appl. No.: 09/377,442

(22) Filed: Aug. 19, 1999

(51) Int. Cl.[7] ............................................. F28F 19/00
(52) U.S. Cl. ..................... 165/41; 165/104.33; 165/168
(58) Field of Search ............................. 165/41, 104.26, 165/104.33, 168, 171, 46, 104.14

(56) References Cited

U.S. PATENT DOCUMENTS

| | | | | |
|---|---|---|---|---|
| 4,880,050 A | * | 11/1989 | Nakamura et al. ............ | 165/41 |
| 5,036,905 A | * | 8/1991 | Eninger et al. ............ | 165/46 X |
| 5,682,943 A | * | 11/1997 | Yao et al. ............ | 165/104.33 X |
| 5,697,428 A | * | 12/1997 | Akachi .............. | 165/104.14 X |
| 5,732,765 A | * | 3/1998 | Drolen et al. ................. | 165/41 |
| 5,743,325 A | * | 4/1998 | Esposto ........................ | 165/41 |
| 5,787,969 A | * | 8/1998 | Drolen et al. ................. | 165/41 |
| 5,806,800 A | * | 9/1998 | Caplin .......................... | 165/41 |
| 5,806,803 A | * | 9/1998 | Watts ....................... | 165/41 X |
| 5,823,477 A | * | 10/1998 | York ........................ | 165/41 X |

FOREIGN PATENT DOCUMENTS

JP            0083586        *    4/1988   ............ 165/104.14

* cited by examiner

Primary Examiner—Christopher Atkinson
(74) Attorney, Agent, or Firm—Kenneth W. Float

(57) ABSTRACT

Heat dissipating apparatus for use in dissipating heat produced by electronic components of a spacecraft. The heat dissipating apparatus comprises first and second radiator panels each having an outer panel faceskin 18 and inner panel faceskin. A heat pipe matrix is disposed between outer and inner panel faceskins of each radiator panel, and a honeycomb core is disposed between the inner and outer panel faceskins that surrounds the heat pipe matrix. A transverse panel interconnects the first and second radiator panels. A plurality of crossing heat pipes extend between and thermally couple to the heat pipe matrices of the first and second radiator panels. The plurality of crossing heat pipes extend outside the plane of the transverse panel.

14 Claims, 1 Drawing Sheet

SPACECRAFT RADIATOR SYSTEM USING CROSSING HEAT PIPES

BACKGROUND

The present invention relates generally to satellites or spacecraft, and more specifically, to a spacecraft or satellite radiator system comprising a crossing heat pipe system that utilizes heat pipes to thermally couple north and south radiator panels on a satellite or spacecraft.

The assignee of the present invention manufactures and deploys spacecraft or satellites into geosynchronous and low earth orbits. Such spacecraft use heat pipes that are used to dissipate heat. The heat pipes transfer thermal energy to spacecraft radiator panels where it is radiated into space.

Conventional communication satellite radiator panels must be sized individually to reject both the payload and solar dissipation during the solstice seasons. Conventional solutions to this problem are disclosed in U.S. Pat. No. 3,749,156 issued to Fletcher, U.S. Pat. No. 5,351,746 issued to Mackey, and U.S. Pat. No. 5,806,803 issued to Watts.

U.S. Pat. No. 3,749,156 discloses the use of two spacecraft panels with heat pipes in one direction (lateral). The lateral heat pipes are coupled together via a third heat pipe on the interior of the spacecraft.

U.S. Pat. No. 5,351,746 discloses three spacecraft panels, each panel constructed with J-shaped heat pipes coupled with straight heat pipes at the short part of the J. The panels are coupled together at intersecting edges with straight heat pipes.

U.S. Pat. No. 5,806,803 discloses a heat pipe network that is constructed from formed and straight heat pipes connected together with a highly conductive material, such as Grafoil, that is used as an interface gasket. The heat pipe network is interconnected to subnadir and auxiliary panels, and thermally couples to North and South radiator panels. The electronic components are mounted to heat pipes on panels attached to the main spacecraft radiator panels. The heat pipes transfer the thermal energy to the radiator panels where it is radiated into space.

The design disclosed in U.S. Pat. No. 5,806,803 does not use header heat pipes in their spacecraft panel. Instead the design of U.S. Pat. No. 5,806,803 couples the lateral heat pipes on the two spacecraft radiator panels to an intermediate set of transverse heat pipes which in turn are thermally coupled by a set of curved heat pipes on the transverse panel.

Accordingly, it is an objective of the present invention to provide for heat dissipating apparatus comprising a spacecraft or satellite radiator system comprising a crossing heat pipe system that utilizes heat pipes to thermally couple north and south radiator panels on a satellite or spacecraft.

SUMMARY OF THE INVENTION

To accomplish the above and other objectives, the present invention provides for a spacecraft or satellite radiator system comprising a crossing heat pipe system that utilizes heat pipes to thermally couple north and south radiator panels embedded in radiator panels disposed on the spacecraft. The spacecraft radiator system comprises first and second radiator panels each comprising an outer panel faceskin, an inner panel faceskin, and a heat pipe matrix disposed between the outer and inner panel faceskins. A honeycomb core may be disposed between the inner and outer panel faceskins that surrounds the heat pipe matrix. A transverse panel interconnects the first and second radiator panels. A plurality of crossing heat pipes extend between and thermally coupled to the heat pipe matrices of the first and second radiator panels. The plurality of crossing heat pipes extend outside the plane of the transverse panel.

By thermally coupling the first and second radiator panels together, the crossing heat pipe system allows the panels to share the solar load during solstice seasons. This increases the thermal dissipation capability of the spacecraft by approximately 11 percent.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
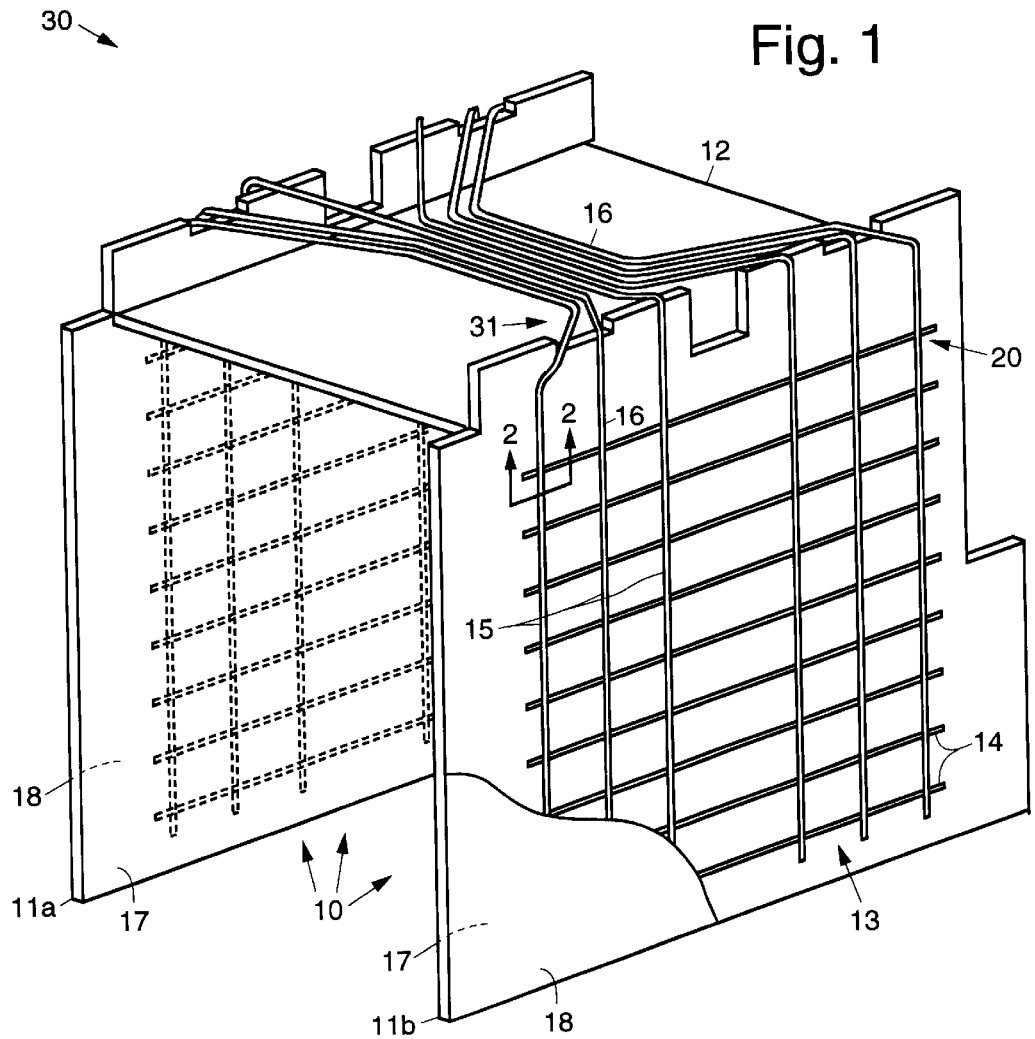
FIG. 1 illustrates heat dissipating apparatus comprising an exemplary spacecraft radiator system employed in a typical three-axis body-stabilized spacecraft or satellite in accordance with the principles of the present invention.

Referring to the drawing figures, FIG. 1 illustrates heat dissipating apparatus 10 comprising an exemplary spacecraft radiator system 10 employed in a typical three-axis body-stabilized spacecraft 30 or satellite 30 in accordance with the principles of the present invention. The exemplary spacecraft radiator system 10 comprises North and South radiator panels 11a, 11b that each have a heat pipe matrix 13 embedded therein or sandwiched between inner and outer panel faceskins 17, 18. A honeycomb core 24 (FIG. 2) is disposed between the inner and outer panel faceskins 17, 18 and surrounds the respective heat pipe matrices 13. The honeycomb core 24 thermally and structurally bridges the heat pipes matrices 13 to the opposing faceskin 17, 18.

The North and South radiator panels 11a, 11b are structurally connected by way of a transverse panel 12, such as an Earth deck panel 12, for example. The set of lateral heat pipes 14 may be bonded to proximal surfaces of the inner faceskins 17 of the radiator panels 11a, 11b and the header heat pipes 15 may be bonded to proximal surfaces of the outer faceskins 18 of the radiator panel 11a, 11b.

Each heat pipe matrix 13 comprises two sets of heat pipes 14, 15 arranged as a matrix and which are in thermal communication. The first set of heat pipes 14 (or lateral heat pipes 14) are roughly perpendicular to the second set of heat pipes 15 (or header heat pipes 15). Heat dissipating components and equipment 25 (FIG. 2) are mounted adjacent to the first set of lateral heat pipes 14 on the inner panel faceskins 17. The second set of header heat pipes 15 is used to efficiently distribute the heat derived from the heat dissipating components and equipment 25 to the respective outer panel faceskins 18 and isothermalizes the radiator panels 11a, 11b.

A set of crossing heat pipes 16 is used to thermally couple the set of header heat pipes 15 on the two radiator panels 11a, 11b. The crossing heat pipes 16 each have a stress relief feature 31 adjacent to the first and second radiator panels 11a, 11b. The crossing heat pipes 16 couple the sets of header heat pipes 15 of the respective radiator panels 11a, 11b together and allow the radiator panels 11a, 11b to share the solar load during solstice seasons. This increases the thermal dissipation capability of the spacecraft 30 by approximately 11 percent.

The set of crossing heat pipes 16 extend outside the plane of the Earth deck panel 12. The set of crossing heat pipes 16 curve or extend around the outside of each of the respective radiator panels 11a, 11b and are thermally coupled to the set of header heat pipes 15, such as in the manner shown in FIG. 2.

Figure 2:
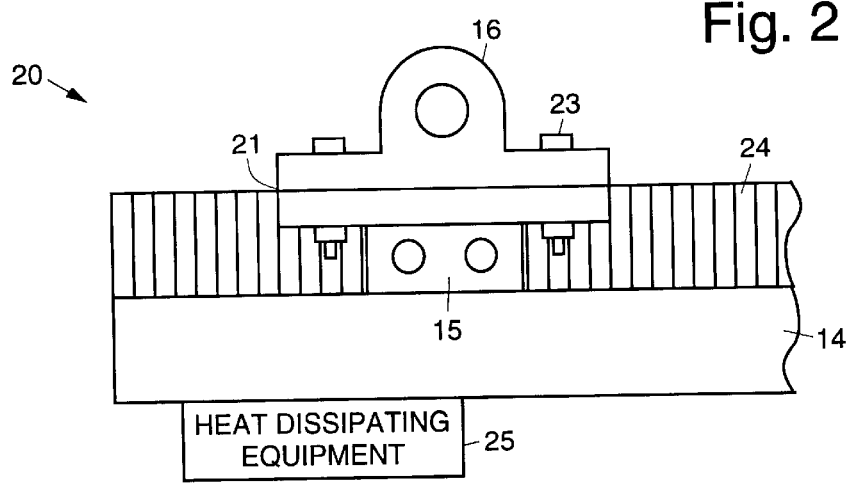
FIG. 2 illustrates details of the thermal interface between heat pipes of the exemplary spacecraft radiator system taken along the lines 2—2 of FIG. 1.

FIG. 2 illustrates details of the thermal interface 20 between the heat pipes 14, 15, 16 of the exemplary spacecraft radiator system 10 taken along the lines 2—2 of FIG. 1. FIG. 2 shows the manner in which thermal coupling between the lateral, header and crossing heat pipes 14, 15, 16 is achieved. The header heat pipes 15 lie across and are in thermal communication with the lateral heat pipes 14 that are in thermal communication with the heat dissipating components and equipment 25. The header heat pipes 15 may be bonded, soldered, or thermally adhered to the lateral heat pipes 14 to provide such thermal communication.

The header heat pipes 15 may be coupled to the crossing heat pipes 16 by means of a flange type interface 21 employing fasteners 23, such as bolts 23, for example. The honeycomb core 24 is shown surrounding the respective heat pipe matrices 13.

The present invention is different from the prior art discussed in the Background section for the following reasons. In contrast to the teachings of U.S. Pat. No. 3,749,156, in the present invention, the two radiator panels 11a, 11b have heat pipes in two directions or in a matrix design. The set of header heat pipes 15 thermally couples the set of-lateral heat pipes 14 to create a completely isothermal panel. The header heat pipes 15 on both radiator panels 11a, 11b are externally coupled using the crossing heat pipes 16. By using the present matrix design, the efficiency of the crossing heat pipes 16 is significantly improved.

In contrast to the teachings of U.S. Pat. No. 5,351,746, in the present invention, only straight heat pipes 14, 15 are used in the radiator panels 11a, 11b. Coupling of the heat pipes within the radiator panels 11a, 11b is accomplished at the intersection of the header and lateral heat pipes 15, 14. There are no J-shaped heat pipes in the present invention. There are only two radiator panels 11a, 11b which are thermally coupled using discrete crossing heat pipes 16 that are not part of the radiator panels 11a, 11b.

In contrast to the teachings of U.S. Pat. No. 5,806,803, in the present invention, there are two sets of lateral and header heat pipes 14, 15 in the radiator panels 11a, 11b. The header heat pipes 15 run the length of the radiator panels 11a. 11b and thermally couple all of the lateral heat pipes 14 together to create isothermal radiator panels 11a, 11b. The present design thermally couples the header heat pipes 15 of the two radiator panels 11a, 11b.

Advantages of the present invention over the prior art are as follows. With regard to U.S. Pat. No. 3,749,156, two sets of heat pipes 14, 15 are used in the matrix design to isothermalize the radiator panels 11a, 11b, this offers a significant improvement in the thermal performance of the system. With regard to U.S. Pat. No. 5,351,746, the present invention uses significantly fewer heat pipes 14, 15 to achieve the coupling of the North and South radiator panels 11a, 11b. This represents a significant mass savings.

With regard to U.S. Pat. No. 5,806,803 the present invention isothermalizes the radiator panels 11a, 11b using the matrix design, and this reduces hot spots on the radiator panels 11a, 11b and maximizes panel dissipation capability. Due to the locations of the header heat pipes 15 adjacent the exterior of the, spacecraft 30, the crossing heat pipe interface 21 can be located on the exterior of the radiator panels 11a, 11b, thereby, not compromising equipment mounting area on the interior of the spacecraft 30.

The present invention provides for approximately a 20% increase in thermal performance over the design of U.S. Pat. No. 5,806,803. This improvement is achieved by minimizing the number of thermal interfaces. The number of thermal interfaces is minimized by using a single set of crossing heat pipes 16 to couple the north/south radiator panels 11a, 11b. The single set heat pipe design is made possible by using the stress relief feature 31 integral with the heat pipe design. The stress relief feature 31 gives the crossing heat pipes 16 structural flexibility to accommodate (1) installation onto the spacecraft 30, (2) coefficient of thermal expansion (CTE) mismatches between spacecraft structure and heat pipes on-orbit, and (3) assembly tolerances between the spacecraft structure and the heat pipes. The design of U.S. Pat. No. 5,806,803 accomplishes the three above design goals by using separate transverse heat pipes and curved connecting heat pipes, which increases the number of thermal interfaces and lowers the overall thermal performance of the system.

Thus, heat dissipating apparatus comprising a spacecraft or satellite radiator system comprising a crossing heat pipe system that utilizes heat pipes to thermally couple north and south radiator panels on a satellite or spacecraft has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. Heat dissipating apparatus for use in a spacecraft comprising:
   first and second radiator panels disposed on opposing faces of a spacecraft that each comprise an outer panel faceskin, an inner panel faceskin, and a heat pipe matrix disposed between the outer and inner panel faceskins;
   a transverse panel interconnecting the first and second radiator panels that is oriented transverse to the first and second radiator panels; and
   a plurality of crossing heat pipes extending between and thermally coupled to the heat pipe matrices of the first and second radiator panels that extend outside the transverse panel.

2. The apparatus of claim 1 wherein each heat pipe matrix comprises:
   a plurality of header heat pipes thermally coupled to the outside panel faceskin; and
   a plurality of lateral heat pipes disposed laterally across and thermally coupled to surfaces of the plurality of header heat pipes and to the inside panel faceskin.

3. The apparatus of claim 1 wherein the first and second radiator panels each further comprise a honeycomb core disposed between the inner and outer panel faceskins that surrounds the heat pipe matrix.

4. The apparatus of claim 1 wherein the crossing heat pipes extend around the outside of each of the respective radiator panels and are thermally coupled to the header heat pipes.

5. The apparatus of claim 2 wherein the lateral heat pipes are bonded to proximal surfaces of the inner faceskins of the radiator panels and the header heat pipes are bonded to proximal surfaces of the outer faceskins of the radiator panels.

6. The apparatus of claim 2 wherein the crossing heat pipes and the header heat pipes are soldered together.

7. The apparatus of claim 2 wherein the crossing heat pipes and the header heat pipes are bonded together.

8. The apparatus of claim 1 wherein the inner panel faceskins of the first and second radiator panels have heat dissipating components disposed thereon.

9. The apparatus of claim 2 wherein a bonded joint interface is formed at intersections between the lateral and header heat pipes.

10. The apparatus of claim 2 wherein the lateral heat pipes are bonded to the inner faceskins of the radiator panels and the header heat pipes are bonded to the outer faceskins of the radiator panels.

11. The apparatus of claim 3 wherein the honeycomb core thermally and structurally bridges the heat pipes matrices to the opposing faceskin.

12. The apparatus of claim 5 wherein the transverse panel comprises aluminum.

13. The apparatus of claim 5 wherein the header heat pipes are coupled to the crossing heat pipes by a flange type interface.

14. The apparatus of claim 1 wherein each of the crossing heat pipes further comprise a stress relief feature adjacent to the first and second radiator panels.

* * * * *